United States Patent [19]

Perego

[11] 4,077,640
[45] Mar. 7, 1978

[54] PERAMBULATOR FOLDABLE SUPPORT FRAME

[76] Inventor: Giuseppe Perego, Via De Gasperi, Arcore (Milan), Italy, 20043

[21] Appl. No.: 741,934

[22] Filed: Nov. 15, 1976

[30] Foreign Application Priority Data

May 24, 1976 Italy .................................. 23556/76

[51] Int. Cl.² ............................................ B62B 11/00
[52] U.S. Cl. ...................................... 280/42; 280/650
[58] Field of Search ............... 280/42, 647, 649, 650; 297/45

[56] References Cited

U.S. PATENT DOCUMENTS

| 3,390,893 | 7/1968 | MacLaren | 280/650 |
| 3,917,302 | 11/1975 | Gebhard | 280/650 |
| 3,976,309 | 8/1976 | Montanelli | 280/650 |
| 3,995,882 | 12/1976 | Watkins | 280/649 |
| 4,019,757 | 12/1977 | Beger et al. | 280/649 |

Primary Examiner—Robert R. Song
Attorney, Agent, or Firm—McGlew and Tuttle

[57] ABSTRACT

A collapsible perambulator cot which is adapted to fold between an operative and inoperative portion which includes in addition to opposed folding side cross-struts and a bottom or base cross-strut a rear cross-strut which have the respective lower ends hinged to the rear folding legs of the frame and which rear cross-struts have its respective upper ends hinged to the rods which tie rods are pivoted to the rear legs of the perambulator. The ends of the base cross-struts are connected to the lower ends of the side cross-struts by a block and pin arrangement so as to not impede the folding of the perambulator.

6 Claims, 7 Drawing Figures

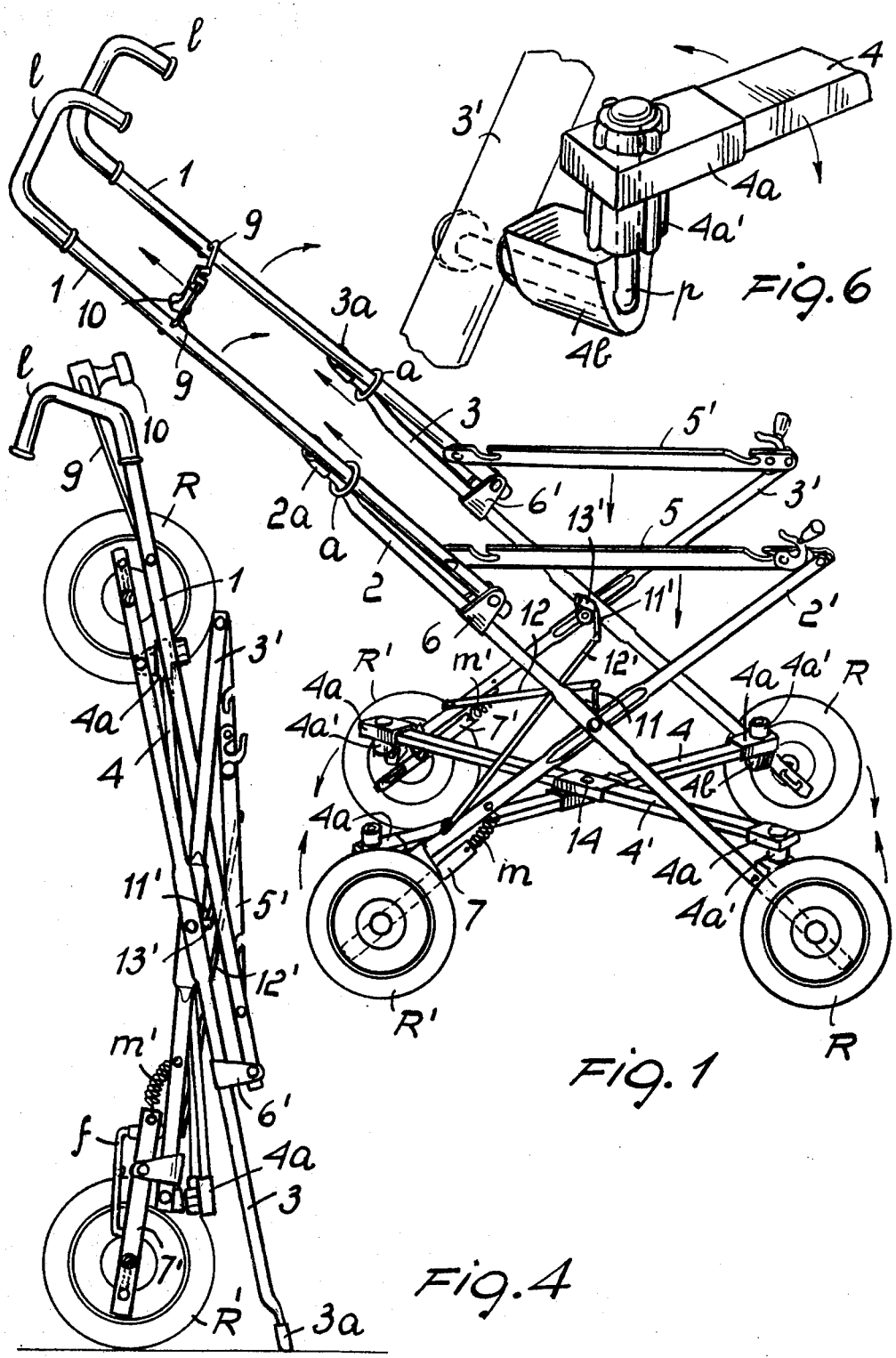

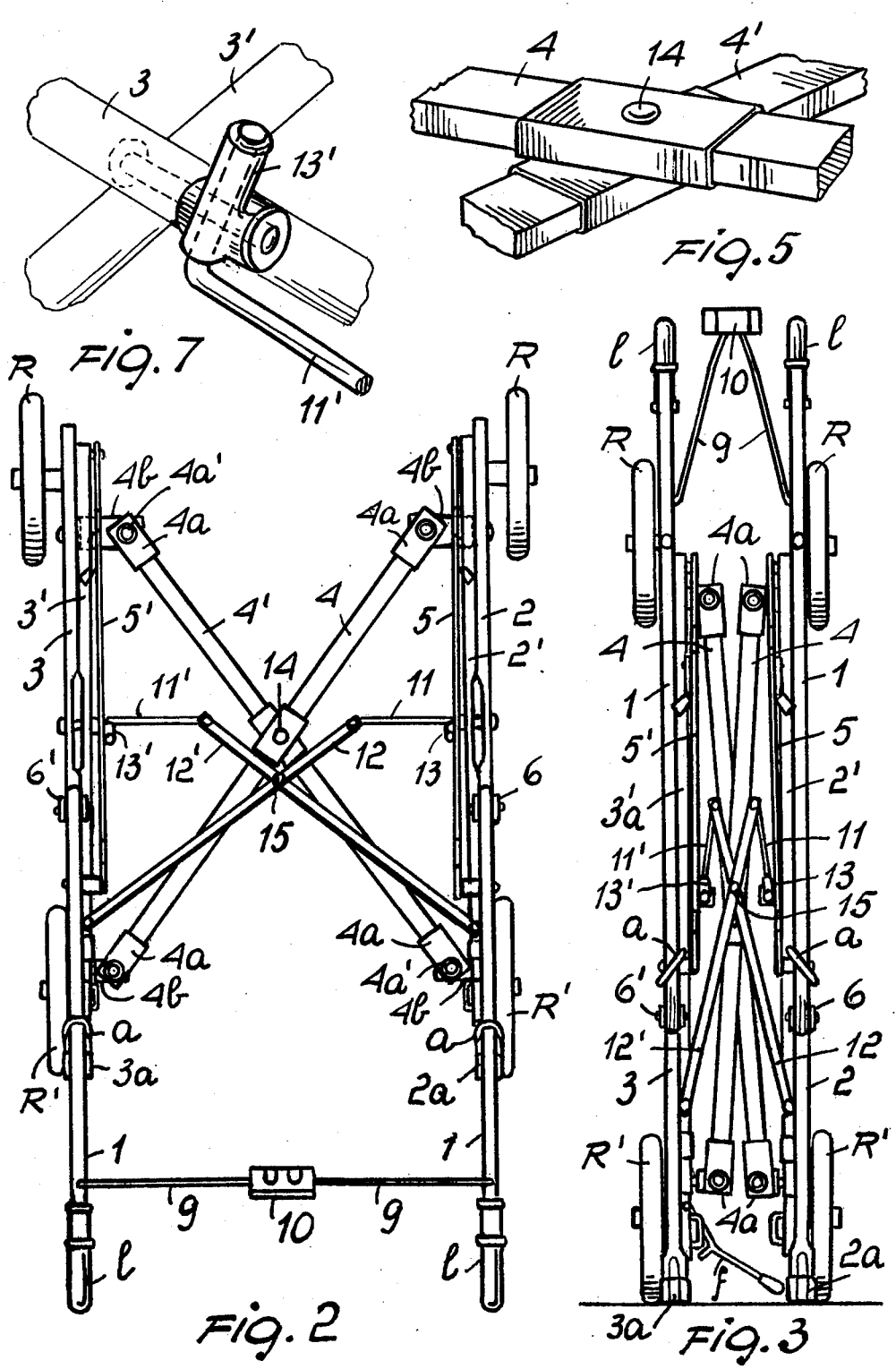

PERAMBULATOR FOLDABLE SUPPORT FRAME

The present invention relates to a perambulator cot support frame, comprising a device enabling it to be stiffened when in its working position, while allowing it to be immediately folded into a minimum space whenever necessary.

Foldable perambulator frames are already known in various forms, but nearly all suffer from the defect of lack of rigidity and stability in the working position.

This facility for folding, to make them storable in a small space and light and comfortable to transport, is usually to the detriment of their stability during use.

The present applicant has already protected a different foldable frame design (with patent application No. 21766 A/76 filed on 31.3.1976) which solves this problem and is characterised by only three cross-struts, namely two on the sides and one at the base, but this frame is provided with a stiffening device which connects the central pivots of the side cross-struts with the central pivot of the base cross-strut, and which has to be locked and unlocked when passing from the working position to the folded position and vice versa, because of which passing from one position to the other presents a certain difficulty.

SUMMARY OF THE INVENTION

This latter problem is completely solved by the applicant by means of the frame according to the invention, which represents considerable progress over known frames.

The frame according to the invention is characteristic because in addition to three cross-struts, namely two on the sides acting as side walls for the cot, and one at the base, it also comprises a fourth cross-strut, namely a rear cross-strut, with its lower ends hinged to the rear legs of the frame and its upper ends hinged to two tie rods also pivoted on the rear legs.

This design has proved very effective as in practice it enables the frame to be automatically folded merely by rotating the curved arms forwards, these latter being provided with handles.

The frame is also characteristic because of the structure of the blocks with fix the ends of the two arms of the base cross-strut to the lower ends of the arms of the side cross-struts, and because of the structure of the pins which fix the tie rods of the new rear cross-strut to the rear legs of the frame.

These characteristics and others of lesser importance will be evident from the description given hereinafter with reference to the accompanying drawings.

These latter are given by way of non-limiting example alone, and illustrate a preferred embodiment of the foldable support frame for the cot of a children's perambulator, according to the present invention, and in which:

FIG. 1 is a side view of the frame in the working position;

FIG. 2 is a view of the frame analogous to FIG. 1, but taken from behind;

FIG. 3 is a view of the frame from behind when folded;

FIG. 4 is a side view of the frame when folded; and

FIG. 5 is a perspective fragmentary detail view of the connection between the arms of the base cross-strut.

FIG. 6 is a partial perspective view of one of the blocks which fix the arms of said base cross-strut to the lower arms of the side cross-struts, and FIG. 7 is a detail showing of one of the pins which fix the tie rods of the rear cross-strut to the rear legs of the frame.

DETAILED DESCRIPTION OF THE PREFERRED EMBODIMENT

As shown in the drawings, the frame according to the invention comprises two arms, 1, 1', two side cross-struts 2, 2', and 3, 3', one base cross-strut 4, 4', two horizontal cot fixing rods 5, 5' and a spacer device consisting of two tie rods 9 pivoted at one end to the central piece 10 (which projects backwards by way of a gripping part), and pivoted at the other end to the arms 1, 1', which can thus be made to mutually approach or withdraw.

Said arms 1, 1' terminate at one end in C-shaped portions covered by handles 1, to permit the perambulator to be properly gripped, while their other ends are pivoted in the clamps 6, 6', which enclose them together with the upper rear portions 2, 3 of the side cross-struts. These latter are tubular, but comprise mutually facing central parts flattened to give more simple fixing. Their ends 2a and 3a are also flattened, and arched to serve as a comfortable support for the arms 1, 1' when in the working position, and remaining fixed to these latter by the rings a. From the aforesaid description, when the rings a are raised, the arms 1, 1' can turn through an arc of 180° to become disposed parallel to the tubular elements 2, 2', 3, 3'.

The base cross-strut 4, 4' allows the structure to be folded not only vertically but also in the direction of its width. The pivots of the front wheels R are fixed to the lower ends of the tubular elements 2, 3, while the pivots of the rear wheels R' are fixed to elements 7, 7' approximately parallel to the elements 2', 3', and to which they are connected by further triangular clamps.

A brake f, rotatable by hand by means of a handle, is provided for locking the left hand rear wheel R'.

Suspension is provided by springs m, m' which connect the ends of each element 7, 7' to the respective element of the cross-strut 2', 3'. The part described heretofore is essentially similar to that of the other frame already protected by the present applicant with a previous patent application (21.766 A/76 filed on 31.3.1976).

The original part or present invention comprises essentially of the fourth rear cross-strut comprising the elements 12, 12' hinged together at 15.

The lower ends of this cross-strut are directly pivoted to the rear legs 2', 3', and the upper ends are hinged to the tie rods 11, 11', which are also pivoted to the rear legs by the characteristic pieces or fixtures 13, 13'.

These latter fixtures or pieces 13, 13', (see FIG. 7) each comprise two cylinders or bores disposed crosswise to form an integral unit. Into one of these cylinders or bores there is inserted the 90° bent end of the tie rod 11 or 11', and into the other cylinder or bore there is inserted a pin traversing the arms of the side cross-struts 2, 2' or 3, 3' at their meeting points.

This original design or construction as stated, allows the frame to be folded immediately in practice by merely raising the handle 10 and the rings a (see FIG. 3) and rotating the arms 1, 1' forwards, so that the arms of the various cross-struts instead of lying in the form of an X lie in an approximately parallel position, and without any mutual interference. To this end, the arms of the base cross-strut 4, 4' are connected together at their centre by a pin 14 (see FIG. 5).

The blocks which connect the ends 4a of said arms 4, 4' to the lower ends of the arms 2, 2' and 3, 3' of the side cross-struts are traversed by L pins indicated by p, one portion of which sits in a cap 4a', and the other portion of which, perpendicular thereto, passes through another piece 4b before traversing one of the arms 2, 2', 3, 3' (see FIG. 6).

As the arm 4' lies above the arm 4, the connection blocks for the former have their caps 4a' below the ends 4a, while the connection blocks for the latter have their caps 4a' disposed above the ends 4a, so that all four are pivoted at the same distance from the ground (see FIG. 1).

It is apparent that the L pins, p, allow freedom of movement both of the arms 4, 4' and the arms 2, 2' and 3, 3' to which they are pivoted, because of which frame folding is not impeded.

The embodiment as drawn and described represents only one preferred embodiment of the invention.

Various modifications may be made thereto by an expert of the art, without leaving the scope of the invention idea.

What we claim is

1. A foldable frame support for a perambulator comprising; a pair of opposed side cross-struts, each of said cross-struts including a front leg and a rear leg of said frame, pivot means interconnecting said rear leg and corresponding front leg intermediate the ends thereof, an arm member pivotally connected to the upper end portion of the respective front legs, a wheel journaled on the lower end portion of the respective front and rear legs, a base cross-strut including crossing arm struts pivoted together intermediate the ends thereof, means for pivoting the opposed ends of the respective arm struts of said base cross-strut to the lower end portion of diagonally disposed front and rear legs, a cot fixing rod connected between the respective rear legs and corresponding arm members, each of said cot fixing rods having one end pivotally connected to the upper end of the associated rear leg and having its other end pivotally connected to the lower end portion of the corresponding arm member above the pivotal connection between said arm member and the upper portion of the corresponding front leg, and a rear cross-struts including intersecting rear strut members pivotally connected intermediate the ends thereof, means pivotally connecting the lower end of said rear cross-struts to a corresponding rear leg, and a tie rod interconnecting the upper ends of said rear cross-struts to its corresponding side-strut.

2. The invention as defined in claim 1, wherein said tie rod is pivotally connected at one end to a corresponding rear strut member, and said tie rod having its other end pivotally connected at the pivotal connection of the side cross-struts.

3. The invention as defined in claim 2, wherein the pivot means for said side cross-struts includes a fixture having angularly disposed bores, one of said bores being adapted to receive a pivot pin for pivotally connecting the corresponding front and rear leg of said side struts, and said tie rod having an angular bent end portion adapted to be journalled in the other bore of said fixture.

4. The invention as defined in claim 1, wherein said pivoting means interconnecting the respective ends of said base cross-struts to a corresponding leg of said side-struts comprises an L-shaped pin, a pivot cap connected to said end of said base cross-strut, said L-shaped pin having a leg portion thereof pivoted to said pivot cap, and said L-shaped pin having its other leg portion pivoted to a corresponding leg of said side cross-strut.

5. The invention as defined in claim 4, and including a spacer block for receiving said other leg portion of said L-shaped pin.

6. The invention as defined in claim 5, wherein one of said base cross-struts is disposed above the other of said base cross-struts, a pivot pivotally connecting said base cross-struts intermediate the ends thereof, and the pivot caps connected to the ends of the upper base cross-struts being disposed to the under surface thereof, and the pivot caps connected to the lower base cross-strut being disposed on the upper surface thereof so that the pivot connection of said base cross-struts to the corresponding legs of said side cross-struts are at the same height above the ground.

* * * * *